Dec. 5, 1939.    F. O. PHILLIPS ET AL    2,182,408
MACHINE FOR INSPECTING, BOXING, AND WEIGHING METAL SHEETS
Filed April 11, 1939    4 Sheets-Sheet 2
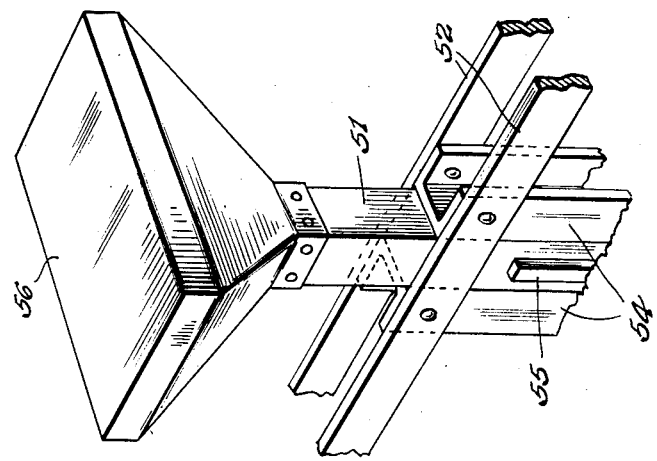
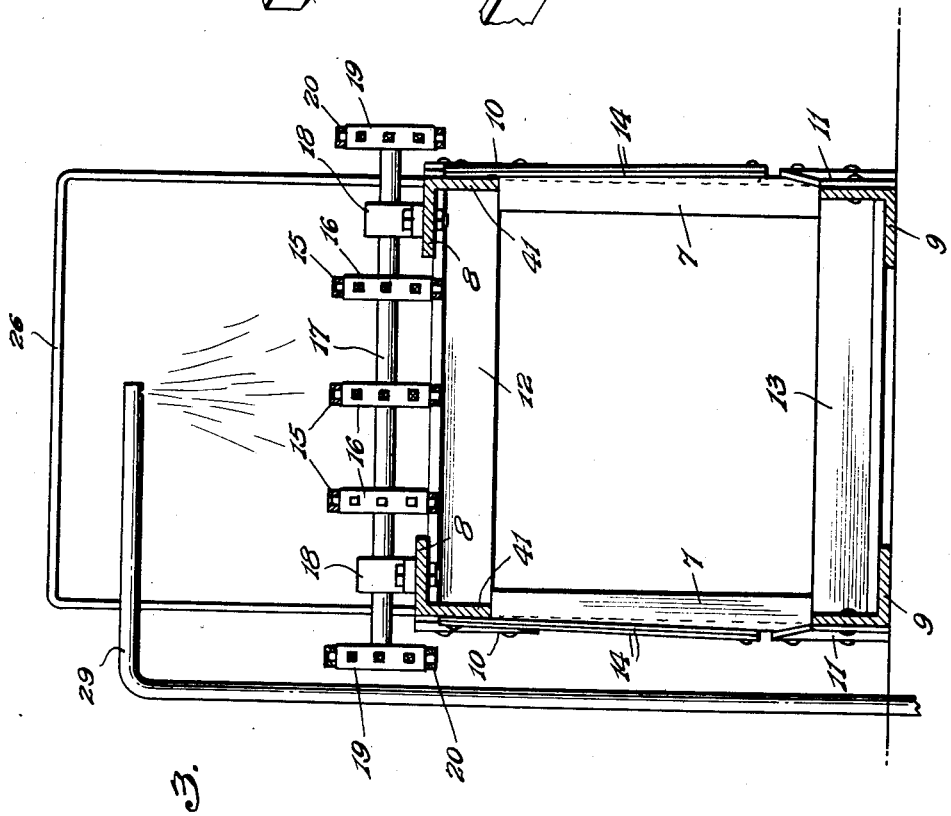
Inventors
F. O. Phillips.
G. T. Evans.
By Ross J Woodward
Attorney

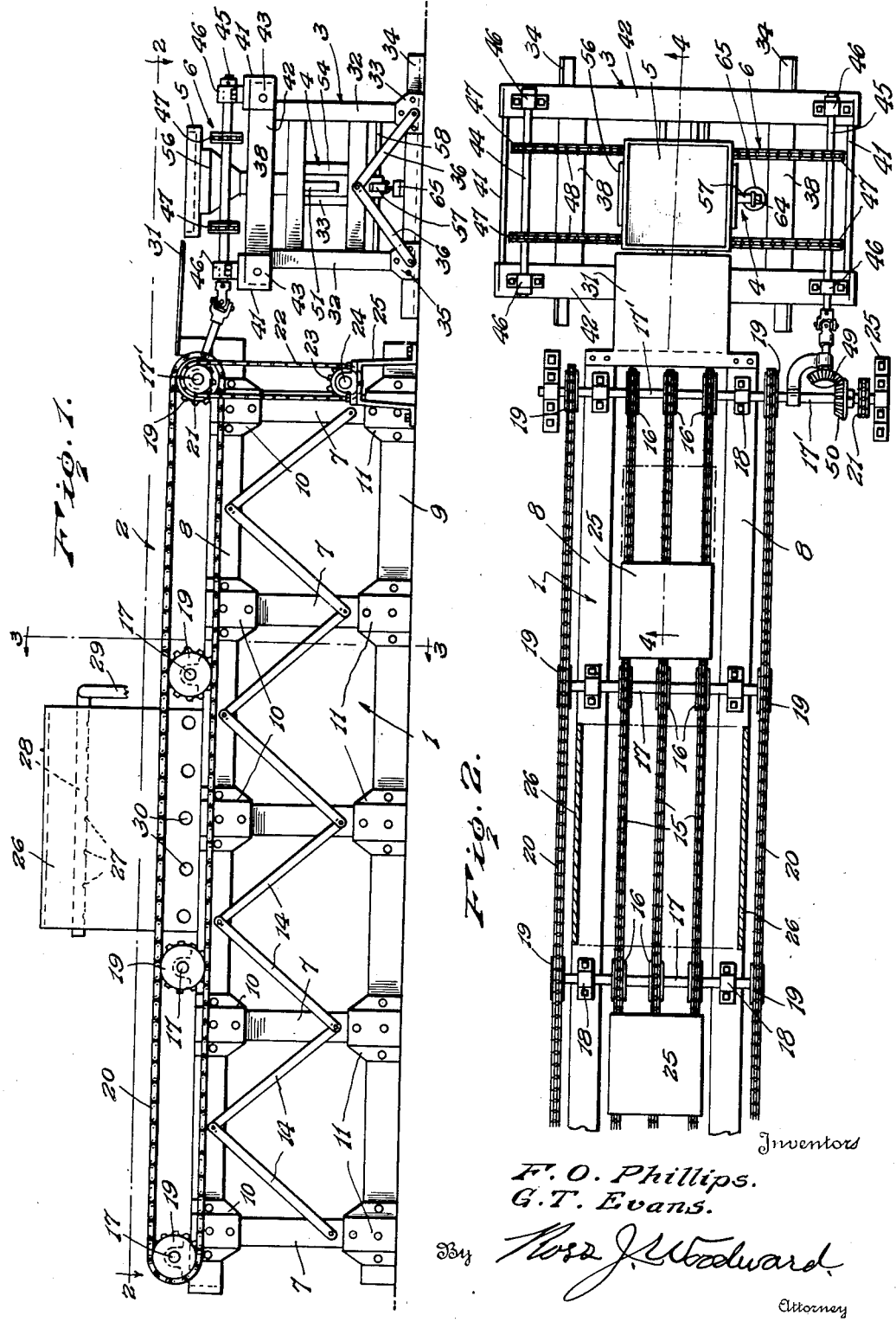

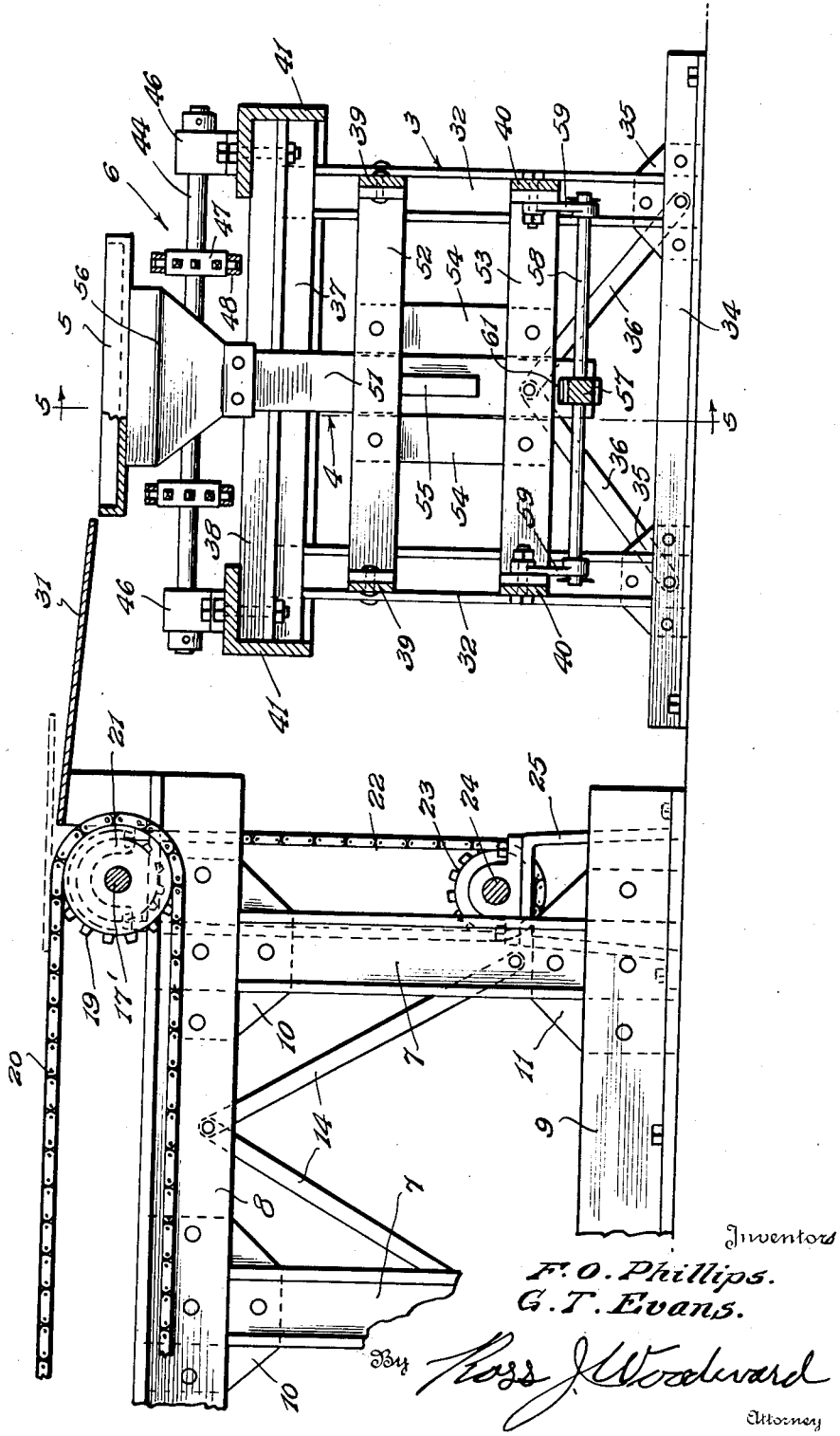

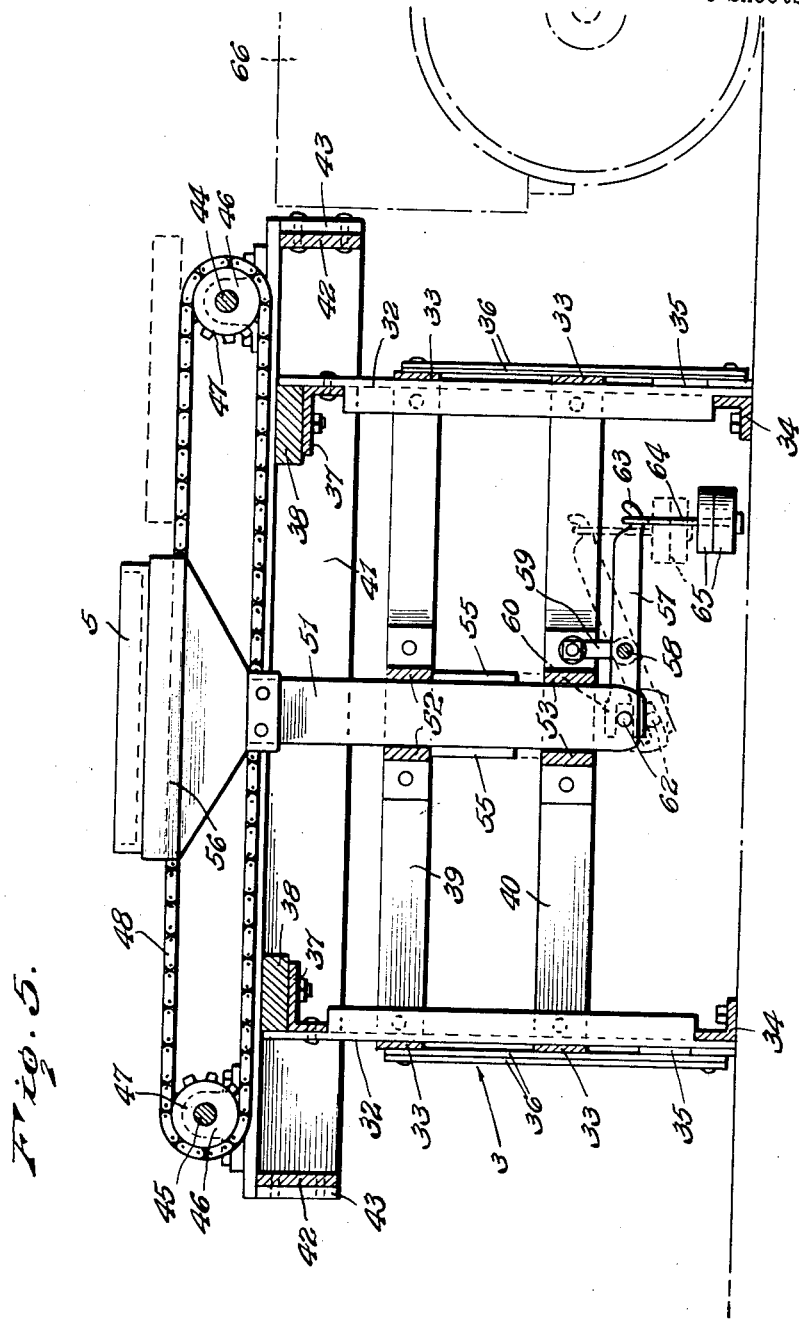

Patented Dec. 5, 1939

2,182,408

UNITED STATES PATENT OFFICE 2,182,408

MACHINE FOR INSPECTING, BOXING, AND WEIGHING METAL SHEETS

Floyd O. Phillips and George T. Evans, Amwell Township, Washington County, Pa., assignors of one-eighth to George L. Lenk, Washington, Pa.

Application April 11, 1939, Serial No. 267,330

9 Claims. (Cl. 249—2)

This invention relates to a machine for inspecting, boxing, and weighing sheet metal plates, and it is one object of the invention to provide a machine of this character of such construction that metal plates, such as tin plates or galvanized metal plates, may be moved along an inspecting table and plates which pass inspection delivered into a packing box resting upon weighing scales from which the box is removed after a predetermined weight of plates have been delivered into the box.

Another object of the invention is to provide a machine wherein the sheet metal plates are moved along the inspection table by endless conveyor means and through a hood enclosing a pipe from which jets of air are discharged, thereby permitting the plates to be cooled as they move along the table for inspection by workmen.

Another object of the invention is to provide a machine having the scale for supporting the plate-receiving box located intermediate the length of a frame extending transversely of the inspecting table and provided with conveyor means for transporting a filled box from the scales to an end of the frame, where it is delivered to a truck or the like for transportation to a storage room.

A further object of the invention is to dispose the scale and the companion endless conveyor in such relation to each other that when the box and the scale-platform upon which it rests are moved downwardly by weight of metal sheets in the box, the box will rest upon the upper flight of the endless conveyor, which will immediately move the filled box toward the delivery end of the frame in which the conveyor operates.

Another object of the invention is to provide a machine of this character wherein the endless conveyors of the inspecting table and the delivery frame or table are both driven from a common source of power and moved in proper timed relation to each other.

Still another object of the invention is to provide a machine having an improved frame construction producing a frame which is very strong but, at the same time, of simplified construction.

And the invention has as a still further object to provide scales so mounted in the delivery table or frame that vertical movement of the shank carrying the box-holding platform will be guided and also limited.

The invention is illustrated in the accompanying drawings, wherein:

Fig. 1 is a side elevation of the improved machine.

Fig. 2 is a top plan view of the machine.

Fig. 3 is a sectional view on an enlarged scale, taken transversely through the main frame of the machine on the line 3—3 of Fig. 1.

Fig. 4 is a sectional view on the line 4—4 of Fig. 2.

Fig. 5 is a sectional view taken vertically through the auxiliary frame of the machine, on the line 5—5 of Fig 4.

Fig. 6 is a perspective view of a portion of the scale.

The improved machine for inspecting, boxing, and weighing metal sheets consists, briefly, of a main frame 1, an endless conveyor 2 carried thereby, an auxiliary frame 3 at the discharge end of the main frame, a scale 4 intermediate the length of the auxiliary frame for supporting a box or other container 5 in position to receive metal sheets from the conveyor of the main frame, and an endless conveyor 6 for removing the container from the scale when the container and a vertically movable member of the scale are shifted downwardly by a predetermined weight of metal sheets deposited in the container.

The main frame 1 has a plurality of posts or uprights 7 at its opposite sides which are spaced from each other longitudinally of the frame and disposed in opposed relation to each other. The posts which are formed of channel metal with their flanges directed inwardly, as shown in Fig. 3, extend vertically between upper and lower side bars 8 and 9 which are formed of angle metal and, in order to firmly secure the posts to the side bars, there have been provided joint plates 10 and 11 which straddle the posts and are secured by rivets passed through the end portions of the posts and through the side bars. Since end portions of the side flanges of the posts are removed and their ends abut edges of the side bars, very firm joints are provided between the posts and the side bars when the unflanged end portions of the posts are disposed in overlapping relation to the side bars and the joint plates riveted into place. Ends of the side bars are connected by upper and lower end bars 12 and 13. In order to brace the posts, there have been provided diagonally extending strips 14 which have their lower ends riveted to the lower portions of the posts and their upper ends riveted to the upper side bars midway of the posts. By so forming the frame, it will be very strong but, at the same time, of light weight.

The conveyor 2, by means of which the sheet metal plates are to be moved along the main frame 1, consists of a plurality of endless chains 15, which extend longitudinally of the frame and are engaged with sprocket wheels 16 carried by shafts 17 which extend transversely of the frame and are rotatably mounted in bearings 18 carried by the horizontal flanges of the upper side bars 8. These shafts project beyond the sides of the frame and carry sprocket wheels 19 engaged by chains 20 by means of which rotary motion is transmitted from the drive shaft 17' at the discharge end of the frame to the other shafts. The drive shaft 17' is of greater length than the other shafts 17 and, at one end, carries a sprocket 21 about which is engaged a sprocket chain 22 extending vertically with its lower portion trained about a sprocket 23 carried by a power shaft 24. This shaft 24 is rotatably mounted through a bearing bracket and receives rotary motion from an engine or other source of power, in any desired manner.

During use of the machine, the metal plates 25 are delivered upon the conveyor chains 15 and moved along the machine through the cooling station or hood 26 towards the discharge end of the frame. As the plates advance toward the cooling station, they are inspected by a workman who stands at one side of the frame, and if any of the plates are imperfect they are removed from the conveyor. After the plates have been inspected and imperfect ones removed, the plates enter the cooling hood, which is formed of sheet metal or other suitable material, and as they pass through this hood, they are subjected to the action of air which is discharged from the discharge openings 27 in the perforated end portion 28 of an air pipe 29 leading from a suitable source of air under pressure. Openings 30 are formed in side walls of the hood, near the lower ends thereof, for escape of air, and since the hood or cooling station is open at its ends, air may also escape from ends of the hood. After the plates leave the cooling station, they are turned over by a workman and, during their movement toward the discharge end of the frame, after being turned over, they are again inspected by a workman and defective plates removed. Therefore, only perfect plates will be discharged from the main frame and pass over the bridge 31 into the box or container 5.

The auxiliary frame 3 has end members provided with corner posts or uprights 32 connected by intermediate cross bars 33. Lower ends of the posts, which are formed of channel metal, are secured in overlapping engagement with base bars 34, the base bars being formed of angle metal, and coupling plates 35 being riveted to the posts and the base bars to firmly secure the posts to the base bars. Diagonally extending bracing strips 36 serve to brace the lower portions of the end members. At their upper ends, the posts are secured to upper cross bars 37 which may be referred to as head bars, and upon these head bars, which are formed of angle metal, are mounted wooden bolsters 38. Upper and lower side bars 39 and 40 extend between the end members and, at their ends, are secured to the posts 32.

A superstructure is carried by the auxiliary frame and consists of side bars 41 and end bars 42. The side bars 41 are formed of angle metal and their end portions are bent and cut to form ears 43 to which ends of the end bars 42 are riveted. A conveyor is carried by the superstructure and has shafts 44 and 45 rotatably mounted in bearings 46. These shafts carry sprockets 47 about which are trained chains 48 and one outer end of the shaft 45 projects toward the main conveyor frame and carries a gear 49 meshing with a gear 50 carried by the shaft 17'. Therefore, rotary motion will be transmitted from the shaft 17' to the shaft 35 and the conveyor of the auxiliary frame will be set in motion whenever the conveyor of the main frame is in motion.

The scale which supports the box 5, has a standard 51 which is disposed vertically and is slidably mounted between pairs of upper and lower cross bars 52 and 53 carried by the upper and lower side bars 39 and 40 of the frame. The standard 51 is rectangular in cross section so that it will be prevented from turning and, in order to prevent it from slipping transversely out of vertical position between the pairs of cross bars, there have been provided guides 54 which are formed of channel metal and are riveted into place between the cross bars with their webs presented toward the standard in engagement with opposed side faces thereof. Blocks 55, which serve as stops, are secured against opposed side faces of the standard and limit vertical movement of the standard by engagement with the upper and lower cross bars 52 and 53. A head or platform 56 is carried by the upper end of the standard and is of such dimensions that it may move vertically between the conveyor chains 48.

The standard and the box are to be held in an elevated position until a predetermined weight of metal sheets has been delivered into the box. In order to do so, there has been provided a scale beam 57 pivoted upon a shaft 58 extending transversely in the auxiliary frame and suspended from the lower side bars 40 by hangers 59. One end of the scale beam 57 is forked, as shown at 60, and extends into a slot 61 formed in the lower end of the standard 51 for engagement with a pin 62. The other end of the scale beam is formed with a hook or bill 63 and from this bill is suspended a weight carrier 64 upon which a suitable number of weights 65 are removably supported. By applying the proper number of weights, the scale will support the standard and the box in an elevated position, as shown in Figs. 1 and 4, until a predetermined weight of metal plates have been delivered into the box. The weight of the metal plates will then cause the standard to be shifted downwardly and as they move downwardly, the portions of the box which protrude from sides of the head or platform 56 will rest upon the conveyor chains. As soon as the box engages the conveyor chains, it will be moved off of the scale to an end of the auxiliary frame and delivered into the truck 66 by means of which the boxes are to be transported to a place of storage.

Having thus described the invention, what is claimed is:

1. A machine of the character described, comprising a main frame, a conveyor for transporting material longitudinally of the frame, an auxiliary frame extending transversely of the main frame adjacent the discharge end of the main frame, a conveyor carried by said auxiliary frame including endless chains spaced from each other transversely of the auxiliary frame, and a scale in the auxiliary frame including a vertically movable beam disposed between the conveyor chains, and a platform at the upper end of said beam movable vertically with the beam from a position supporting a container above the conveyor chains to a lowered position between the chains for disposing a filled container upon the conveyor chains upon a predetermined weight placed in said container.

2. A machine of the character described, comprising a main frame having vertically disposed posts, upper and lower side bars, plates fitting about the upper and lower end portions of the posts and secured to the posts and the side bars, bearings carried by the upper side bars, shafts journaled through said bearings transversely of the frame, sprocket wheels carried by said shafts between the upper side bars, conveyor chains extending longitudinally in said frame and engaged with said sprocket wheels, one shaft constituting a drive shaft, drive chains, sprockets carried by said shafts and engaging said drive chains, an auxiliary frame extending transversely of the first frame, shafts rotatably carried by the auxiliary frame, sprockets carried by the shafts of the auxiliary frame, conveyor chains extending longitudinally of the auxiliary frame and engaged with the sprockets thereof, means for transmitting rotary motion from the drive shaft of the first frame to one shaft of the auxiliary frame, a scale carried by the auxiliary frame opposite the discharge end of the main frame and having a standard shiftable vertically, a platform at the upper end of said standard between the conveyor chains of the auxiliary frame and projecting upwardly above the same for supporting a container normally above and out of engagement with the conveyor chains of the auxiliary frame, and a bridge for delivering material from the conveyor of the main frame into a container resting upon the platform of said scale, the container when filled with a predetermined weight of material being moved downwardly with the standard of the scale into position to rest upon the conveyor chain of the auxiliary frame and be moved off of the platform.

3. A machine of the character described, comprising a frame having end members, upper and lower side bars extending between the end members, pairs of upper and lower cross bars extending between the side bars intermediate the length of the frame, a scale having a standard extending vertically between the pairs of upper and lower cross bars, guides carried by the cross bars and engaging opposite side faces of said standard, stops extending from said standard for limiting vertical movement of the standard by engagement with the upper and lower cross bars, a shaft extending transversely in the frame between the side bars, a balancing bar pivotally carried by said shaft and having one end pivotally engaged with the lower end of said standard, a weight carried by the other end of said balancing bar, a platform at the upper end of said standard for suporting a container, and a conveyor carried by said frame and including endless chains extending longitudinally of the frame at opposite sides of the platform for receiving a container from the platform when the standard is shifted downwardly by a predetermined weight of material in the container.

4. A machine of the character described comprising a frame having vertically disposed posts, end bars connecting said posts, side bars connecting said posts, bolsters resting on said end bars, a superstructure having side and end bars, the side bars being secured on said bolsters, bearings carried by the side bars of the superstructure, shafts journaled through said bearings and extending transversely across ends of the superstructure, cross bars carried by the side bars of said frame, vertically disposed guide bars carried by said cross bars, a scale having a standard slidable vertically between said guide bars, means carried by said standard for engaging said cross bars and limiting vertical movement of the standard, a platform at the upper end of said standard for supporting a container, a balancing beam extending longitudinally in said frame and pivotally mounted with one end engaging said standard, weight holding means at the other end of said balancing beam, sprockets carried by said shafts, and conveyor chains trained about said sprockets and extending longitudinally of the superstructure at opposite sides of said platform for receiving a container and moving the container off of the platform when the standard and a container resting upon the platform are moved downwardly by a predetermined weight of material in the container.

5. In a machine of the character described, a main frame, a conveyor for transporting material longitudinally of the frame toward the discharge end thereof, an auxiliary frame at the discharge end of the main frame, a conveyor carried by the auxiliary frame and including endless conveyor members spaced transversely from each other, scales in the auxiliary frame having a standard shiftable vertically between the spaced conveyor members and a platform at the upper end of the standard normally projecting upwardly above the conveyor of the auxiliary frame for supporting a container above the conveyor, and means for delivering material from the conveyor of the main frame into a container resting on the platform of the scales whereby a predetermined weight of material in the container may shift the standard of the scales downwardly and deposit the container on the conveying members of the conveyor of the auxiliary frame for removal thereby from the platform.

6. In a machine of the character described, a main frame, a conveyor for moving material longitudinally of the main frame toward the discharge end of the frame, an auxiliary frame at the discharge end of the main frame, scales carried by the auxiliary frame and having a vertically movable standard provided with a platform at its upper end for supporting a container in position to receive material from the conveyor of the main frame, and a conveyor carried by the auxiliary frame including conveyor members at opposite sides of the scale in position for receiving the container and removing the same from the platform when the container and the standard are lowered by a predetermined weight of material in the container.

7. In a machine of the character described, a frame, pairs of upper and lower cross bars intermediate the length of said frame, a scale having a standard extending vertically between the pairs of upper and lower cross bars, guides carried by the cross bars and engaging opposite faces of the standard, a shaft extending transversely in the frame, a balancing bar pivotally carried by said shaft and having one end connected with the lower end of said standard, a weight carried by the other end of said balancing bar, a platform at the upper end of said standard for supporting a container above the frame, and conveyor means extending longitudinally of the frame at opposite sides of the platform for receiving a container from the platform and moving the container away from the platform when the standard is shifted downwardly by a predetermined weight of material in the container.

8. In a machine of the character described, a frame, a superstructure carried by said frame, bearings at opposite sides of said superstructure, shafts journaled through said bearings and extending transversely across end portions of the superstructure, guide means intermediate the length of said frame, a scale having a standard slidable vertically in engagement with said guide means and projecting upwardly through the superstructure, a platform at the upper end of said standard for supporting a container, a balancing beam extending longitudinally in said frame and pivotally mounted with one end engaging said standard, weight holding means at the other end of said balancing beam, and endless conveyors driven from said shafts and extending longitudinally of the superstructure at opposite sides of the platform for receiving a container and moving the container off of the platform when the standard and the platform are moved downwardly by a predetermined weight of material in a container upon the platform.

9. In a machine of the character described, a frame, a conveyor having endless chains extending longitudinally of said frame in transverse spaced relation to each other, a scale mounted in the frame below the conveyor and including a standard movable vertically through the frame intermediate the length of the conveyor and having a support at its upper end movable vertically with the standard between the endless chains and normally projecting above the chains for supporting a container in an elevated position with portions of the container projecting from sides of the support but out of contact with the chains in position to receive material, and means for delivering material into said container, the container when moved downwardly by a predetermined weight of material therein being disposed upon the endless chains for removal thereby from the support.

FLOYD O. PHILLIPS.
GEORGE T. EVANS.